(12) United States Patent
Udagawa et al.

(10) Patent No.: US 11,603,703 B2
(45) Date of Patent: Mar. 14, 2023

(54) PRIVACY SCREEN APPARATUS METHOD OF ADJUSTING SAME

(71) Applicant: Knoll, Inc., East Greenville, PA (US)

(72) Inventors: Masamichi Udagawa, New York, NY (US); Sigrid Moeslinger, New York, NY (US); Mark Jones, East Greenville, PA (US)

(73) Assignee: Knoll, Inc., East Greenville, PA (US)

( * ) Notice: Subject to any disclaimer, the term of this patent is extended or adjusted under 35 U.S.C. 154(b) by 260 days.

(21) Appl. No.: 16/887,448

(22) Filed: May 29, 2020

(65) Prior Publication Data

US 2020/0383501 A1 Dec. 10, 2020

Related U.S. Application Data

(60) Provisional application No. 62/858,389, filed on Jun. 7, 2019.

(51) Int. Cl.
*E06B 9/24* (2006.01)
*A47B 97/00* (2006.01)

(52) U.S. Cl.
CPC ............ *E06B 9/24* (2013.01); *A47B 97/00* (2013.01); *A47B 2200/12* (2013.01)

(58) Field of Classification Search
CPC ....... E06B 9/24; A47B 2200/12; A47B 97/00; E04B 2/7425; E04B 2/7462; E04B 2002/7483
See application file for complete search history.

(56) References Cited

U.S. PATENT DOCUMENTS

| | | | |
|---|---|---|---|
| 2,821,450 A | 1/1958 | Knoll | |
| 4,248,325 A | 2/1981 | Georgopoulos | |
| 4,325,597 A | 4/1982 | Morrison | |
| 4,535,577 A * | 8/1985 | Tenser | E04B 2/7429 174/495 |
| 5,287,909 A | 2/1994 | King et al. | |
| 5,675,946 A * | 10/1997 | Verbeek | E06B 3/4663 52/64 |
| 5,680,893 A | 10/1997 | Neer | |
| 5,966,879 A * | 10/1999 | Verbeek | E05D 15/0643 49/404 |
| 6,000,180 A | 12/1999 | Goodman et al. | |

(Continued)

*Primary Examiner* — Andrew J Triggs
(74) *Attorney, Agent, or Firm* — Buchanan Ingersoll & Rooney PC (57) ABSTRACT

A privacy screen attachment apparatus can include a screen body having a plurality of elongated rungs spaced apart from each other. The rungs can be configured to facilitate releaseable attachment to screen bodies and other structures to allow for an adjustment in the extent to which a visible barrier is provided. Structures that can be connected to the rungs can also permit other functionality (e.g. attachment of a tackable surface, dry erase board, etc.) in addition to adjusting the visible barrier provided by the body of the privacy screen apparatus. A connection mechanism can be provided to facilitate a releasable attachment of such structures to the rungs without requiring use of any mechanical tools. Embodiments of the connection mechanism can be configured to also help prevent accidental disconnection to avoid accidents that could result in damage to the privacy screen apparatus or other objects.

18 Claims, 10 Drawing Sheets

(56) References Cited

U.S. PATENT DOCUMENTS

| | | | |
|---|---|---|---|
| 6,002,613 | A | 12/1999 | Cloud et al. |
| D427,783 | S | 7/2000 | Luedke |
| 6,295,764 | B1 * | 10/2001 | Berridge ............... E04B 2/7425 52/36.5 |
| 6,367,213 | B1 | 4/2002 | Reuter et al. |
| D457,359 | S | 5/2002 | Chan |
| D458,040 | S | 6/2002 | Stannis et al. |
| 6,896,028 | B2 | 5/2005 | Brennan |
| 7,310,918 | B1 | 12/2007 | Reuter et al. |
| 7,789,025 | B2 | 9/2010 | Michaud, II et al. |
| D653,862 | S | 2/2012 | Hairston |
| 8,365,798 | B2 | 2/2013 | Feldpausch et al. |
| D796,216 | S | 9/2017 | Rockwell et al. |
| D800,459 | S | 10/2017 | Rockwell et al. |
| 9,920,520 | B2 | 3/2018 | Udagawa et al. |
| 2017/0226749 | A1 | 8/2017 | Fjetland |
| 2020/0383501 | A1 * | 12/2020 | Udagawa ............... A47B 97/00 |

* cited by examiner

PRIVACY SCREEN APPARATUS METHOD OF ADJUSTING SAME

CROSS-REFERENCE TO RELATED APPLICATION

The present application claims priority to U.S. Provisional Patent Application No. 62/858,389, filed on Jun. 7, 2019.

FIELD

The present innovation relates to privacy screens and methods and mechanisms used to provide privacy screens adjacent to a work surface of an articular of furniture (e.g. adjacent a desktop of a desk, adjacent a countertop of a counter, or adjacent a tabletop of a table etc.)

BACKGROUND

Privacy screens and modesty screens can be utilized to provide a visible barrier in a workplace setting or other setting. In the art, the term "privacy" can often refer to the ability of a screen to provide a visible barrier above a work surface (e.g. to provide a barrier to prevent seeing a person's chest or head). Examples of privacy screens and/or modesty screens can be appreciated from U.S. Pat. Nos. 9,920,520, 8,365,798, 7,789,025, 7,310,918, 6,896,028, 6,367,213, 6,000,180, 5,966,879, 5,675,946, 5,680,893, 5,287,909, 4,325,597, 4,248,325, and 2,821,450, U.S. Design Pat. Nos. D800,459, D796,216, D653,862, D458,040, D457,359, and D427,783 and U.S. Patent Application Publication Nos. 2017/0226749 and 2012/0304441.

SUMMARY

A privacy screen attachment apparatus can include a screen body having a plurality of elongated rungs spaced apart from each other. The rungs or slats of the screen body can be configured to facilitate releasable attachment to screen bodies and/or other structures to allow for an adjustment in the extent to which a visible barrier is provided. Structures that can be connected to the rungs can also permit other functionality (e.g. attachment of a tackable surface, dry erase board, etc.) in addition to adjusting the visible barrier provided by the body of the privacy screen apparatus. A connection mechanism can be provided to facilitate a releasable attachment of such structures to the rungs without requiring use of any mechanical tools. Embodiments of the connection mechanism can utilize connectors that can be configured to releasably attach to the rungs while also helping prevent accidental disconnection to avoid accidents that could result in damage to the privacy screen apparatus or other objects.

In some embodiments, a privacy screen apparatus can include a first vertically elongated member, a second vertically elongated member, and a plurality of spaced apart rungs extending between the first vertically elongated member and the second vertically elongated member. The first vertically elongated member can be attached to a first attachment device and the second vertically elongated member can be attached to a second attachment device.

In some embodiments, the first attachment device can include a clamping mechanism and the second attachment device can also include a clamping mechanism. In other embodiments, the attachment devices can include fasteners, adhesives and/or other types of fastening mechanisms for attachment of the vertically elongated members to position those members adjacent a work surface (e.g. desktop, tabletop, countertop, etc.).

Each rung can be structured as a rod, a beam, or another type of horizontally extending elongated member. A length of each rung can extend between the first vertically extending member and the second vertically extending member.

The rungs of the apparatus can include a first top rung, a second rung below the first top rung, and a third rung below the second rung, the first top rung and the second rung spaced apart by a first gap, the second rung and the third rung spaced apart by a second gap. Other embodiments can utilize more than three rungs or only two rungs. For example, the rungs can also include a fourth rung below the third rung, and a fifth rung below the fourth rung. The fourth rung and third rung scan be paced apart by a third gap and the fourth rung and the fifth rung spaced apart by a fourth gap. As yet another example, there can also be a sixth rung below the fifth rung so that the fifth rung and the sixth rung are spaced apart by a fifth gap.

Each rung can have a top side having a receptacle that defines a first channel. The first channel can be curved from a mouth of the first channel defined at or adjacent the top side of the rung to a terminal end of the channel that is located within the rung below the mouth and inward of the mouth. A connector that is attachable to an object (or already attached to an object) can be releasably attachable to the receptacle via the first channel. The connector can be releasably attachable to the receptacle via the first channel so that attachment of the connector and releasing of the connector occur without use of any mechanical tool.

In some embodiments, the first channel can be curved from the mouth of the first channel defined at or adjacent the top side of the rung to the terminal end of the channel and the connector can have a terminal end portion that is curved to mate a curvature of the first channel so that the connector is releasable from the first channel via pulling the connector while the connector is rotated along the curvature of the first channel. In some embodiments, the connector can have a curved segment that extends between the terminal end of the connector and an upper portion of the connector that extends downwardly from the curved segment when the terminal end is within the first channel. The curved segment can be a top of the connector when the terminal end is within the first channel.

A privacy screen apparatus can include a first vertically elongated member, a second vertically elongated member, and a plurality of spaced apart rungs extending between the first vertically elongated member and the second vertically elongated member. The rungs can include a first top rung, a second rung below the first top rung, and a third rung below the second rung. The first top rung and the second rung can be spaced apart by a first gap. The second rung and the third rung can be spaced apart by a second gap. Each of the rungs can have having a top side having a receptacle that defines a first channel. The first channel can extend from an upper mouth defined at or adjacent the top side of the rung to a terminal end of the channel that is located within the rung below the mouth. A connector can be releasably attachable to the receptacle via the first channel so that attachment of the connector to the rung and releasing of the connector from the rung occur without use of any mechanical tool.

In some embodiments, the first channel of each rung can be curved from the mouth of the first channel defined at or adjacent the top side of the rung to the terminal end of the first channel. The connector can have a terminal end portion that is curved to mate the curvature of the first channel so that the connector is releasable from the first channel via pulling the connector while the connector is rotated along the curvature of the first channel.

In some embodiments, the connector can have a curved segment that extends between the terminal end of the connector and an upper portion of the connector that extends downwardly from the curved segment when the terminal end is within the first channel. The curved segment can be a top of the connector when the terminal end is within the first channel.

In some embodiments, the first channel can extend linearly from the terminal end of the first channel to the mouth of the first channel. The connector can be configured as a hook element such that the a terminal end portion extends linearly from a terminal end to a first upper curved portion and a linearly extending upper portion extends from the first upper curved portion to a second upper curved portion for positioning on an outer upper portion of the rung between the mouth of the first channel and an outer face of the rung. The connector can also include an attachment portion extending from the second curved portion. The attachment portion can be sized and configured for attachment to a rear side of an object.

Embodiments of the apparatus can also include one or more objects. Each object can be attached to at least one connector or at least two connectors. For instance, embodiments can include a panel having a body where a first connector is attached to a rear side of the body and a second connector is also attached to the rear side of the body below the first connector.

In some embodiments, the second connector can be configured as a hook element for releasable attachment to one of the rungs below the rung to which the first connector is attachable. For such embodiments, the first and second connectors can have the same type of hook element configuration or can have different hook element configurations. For example, in some embodiments, the second connector can have a terminal end portion that extends linearly from a terminal end to a first upper curved portion and a linearly extending upper portion extending from the first upper curved portion to a second upper curved portion for positioning on an outer upper portion of the rung below the rung to which the first connector is attachable. The outer upper portion of the rung below the rung to which the first connector is attachable can be between the mouth of the first channel of the rung and an outer face of the rung. The first connector can have a similar structure for attachment to a rung above the rung to which the second connector is attachable.

In other embodiments, the first connector can have such a hook element structure and the second connector can have a different type of hook element. For instance, the second connector can be attached to the object such that the second connector is positioned below the first connector. The second connector can have a linearly elongated connector portion extending away from a rear side of the object and a protrusion that vertically extends from an upper side of the linearly elongated connector portion for being matingly positioned within a lower aperture of a rung below the rung to which the first connector is attachable (e.g. a third rung when the first connector is releasably attached to a first top rung or a second upper rung).

An article of furniture is also provided. An article of furniture can include a work surface and an embodiment of the privacy screen apparatus positioned adjacent the work surface.

A method of installing a privacy screen apparatus is also provided. Embodiments of the method can utilize different embodiments of the privacy screen apparatus. Some embodiments of the method can include positioning a privacy screen apparatus adjacent to a work surface so that a first vertically elongated member is spaced apparat from a second vertically elongated member and a plurality of spaced apart rungs extend between the first vertically elongated member and the second vertically elongated member. At least one object can be releasably attached to the rungs of the privacy screen apparatus without use of any mechanical tools by manipulation of a first connector and a second connector attached to a rear side of the object so that the first connector and second connector engage different rungs of the privacy screen apparatus for releasable attachment of the object to the rungs.

Other details, objects, and advantages of the invention will become apparent as the following description of certain exemplary embodiments thereof and certain exemplary methods of practicing the same proceeds.

BRIEF DESCRIPTION OF THE DRAWINGS

Exemplary embodiments of privacy screen apparatuses and screen attachment apparatuses are shown in the accompanying drawings and certain exemplary methods of making and practicing the same are also illustrated therein. It should be appreciated that like reference numbers used in the drawings may identify like components.

DETAILED DESCRIPTION OF EXEMPLARY EMBODIMENTS

Referring to FIGS. 1-10, a privacy screen apparatus 1 can include at least one screen body 2 that can be defined by a plurality of rungs 9 that are spaced apart from each other by gaps 10. The rungs 9 can extend between vertically elongated members 7. Each vertically elongated member 7 can be configured as a beam, post, support, or other type of vertically elongated member. The length of the vertically elongated members 7 can define the height H of the body of the privacy screen apparatus 1.

Figure 1:
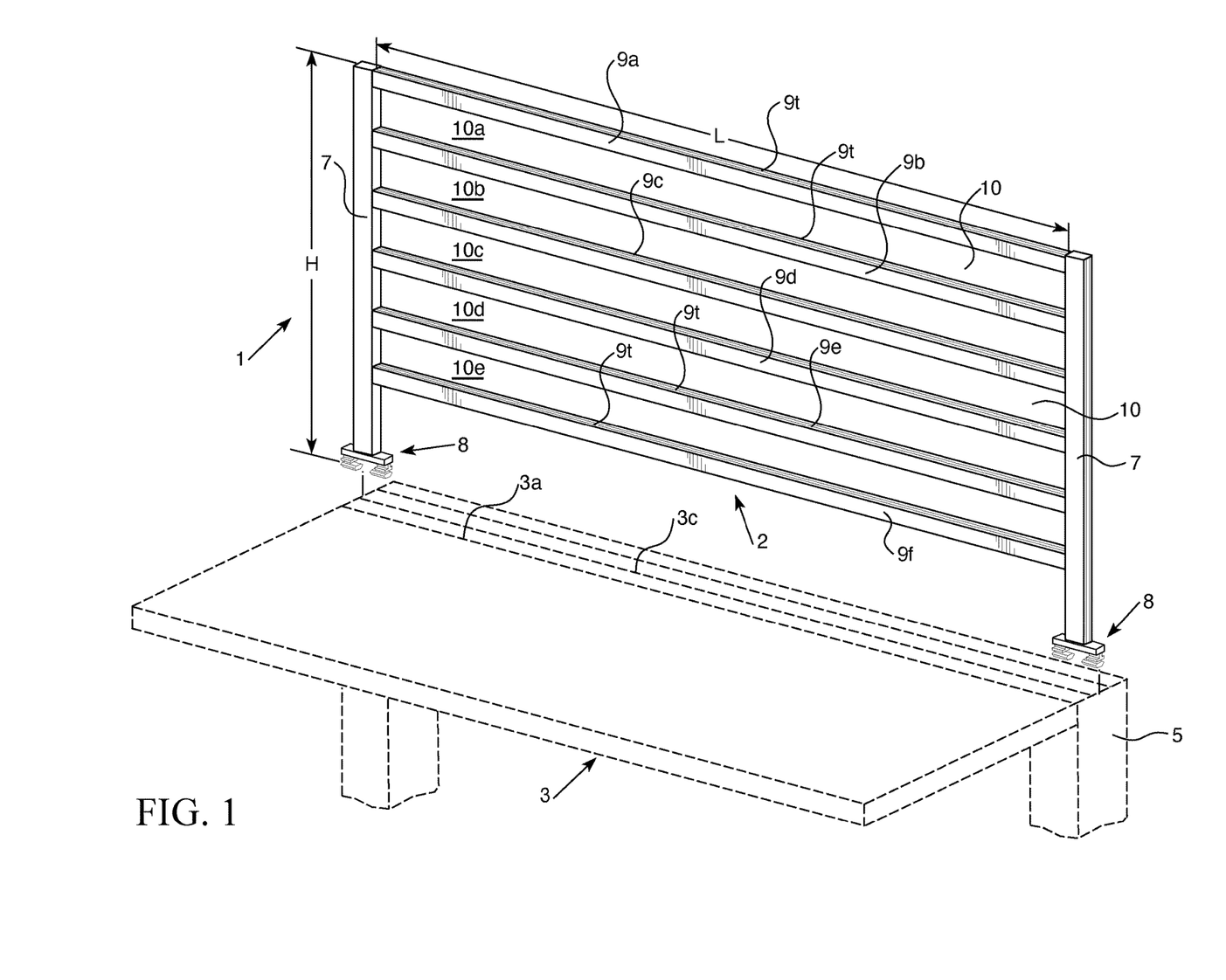
FIG. 1 is a perspective view of a first exemplary embodiment of a privacy screen apparatus. An exemplary work surface of an article of furniture is shown in broken line to indicate an exemplary attachment of the privacy screen apparatus to the article of furniture adjacent to the work surface of the article of furniture.

A bottom of each vertically elongated member 7 can be attached to an attachment device 8 for attachment to an article of furniture or other structure so that the body of the privacy screen apparatus can be positioned adjacent to a work surface to provide a physical barrier that can at least partially block the view into a particular work area by the work surface.

For example, the attachment devices 8 can be configured for attachment to a base 5 of an article of furniture or to a work surface 3 of the article of furniture. In some embodiments, the attachment devices 8 can each include a clamp mechanism for attachment adjacent to a peripheral edge 3a of the work surface 3. In other embodiments, the attachment devices 8 can be configured for attachment to another type of structure 3c near a work surface such as a cord conduit, a partition wall structure, a cubicle frame element, or a component of another type of article of furniture.

Rungs 9 can extend between first and second vertically elongated members that are spaced apart from each other. Each rung 9 can be configured as a beam, a rod, or other type of horizontally extending elongated member. In some embodiments, the length L of each rung 9 can define the spacing between the vertically elongated members 7.

Each rung 9 can be spaced apart from one or more immediately adjacent rungs by a gap 10. Such a configuration can define a fence-like or ladder-like structure to the screen body 2 of the privacy screen apparatus 1. There may be a number of rungs 9. For instance, there can be a first top rung 9a that extends between tops of first and second spaced apart vertically elongated members 7. A second rung 9b can be positioned below the first rung 9a that is spaced apart from the first rung 9a by a first gap 10a. There can be a third rung 9c positioned below the second rung 9b that is spaced apart from the second rung 9b by a second gap 10b. There may be a fourth rung 9d positioned below the third rung 9c that is spaced apart from the third rung 9c by a third gap 10c. A fifth rung 9e can be positioned below the fourth rung 9d that is spaced apart from the fourth rung 9d by a fourth gap 10d. A sixth rung 9f can be below the fifth rung 9e that is spaced apart from the fifth rung 9e by a fifth gap 10e.

It should be appreciate that immediate adjacent can refer to the position of a rung being directly next to one or more other rungs without another rung being between them. For example, the second rung 9b is immediately adjacent to the first top rung 9a and the third rung 9c because it is between those rungs without any other intermediate rung being between them in the embodiment shown in FIG. 1. As another example, the fifth rung 9e is immediately adjacent to the fourth rung 9d and the sixth rung 9f in the embodiment shown in FIG. 1.

Each rung 9 can have a top side 9t. Each top side 9t can be configured to include at least one receptacle 21 of a connection mechanism 20 for releasable attachment of at least one object to the rung 9. Some embodiments can be configured to include a single receptacle component. Other embodiments of the rungs 9 can include spaced apart receptacle components within the top side 9t of the rung.

Figure 2:
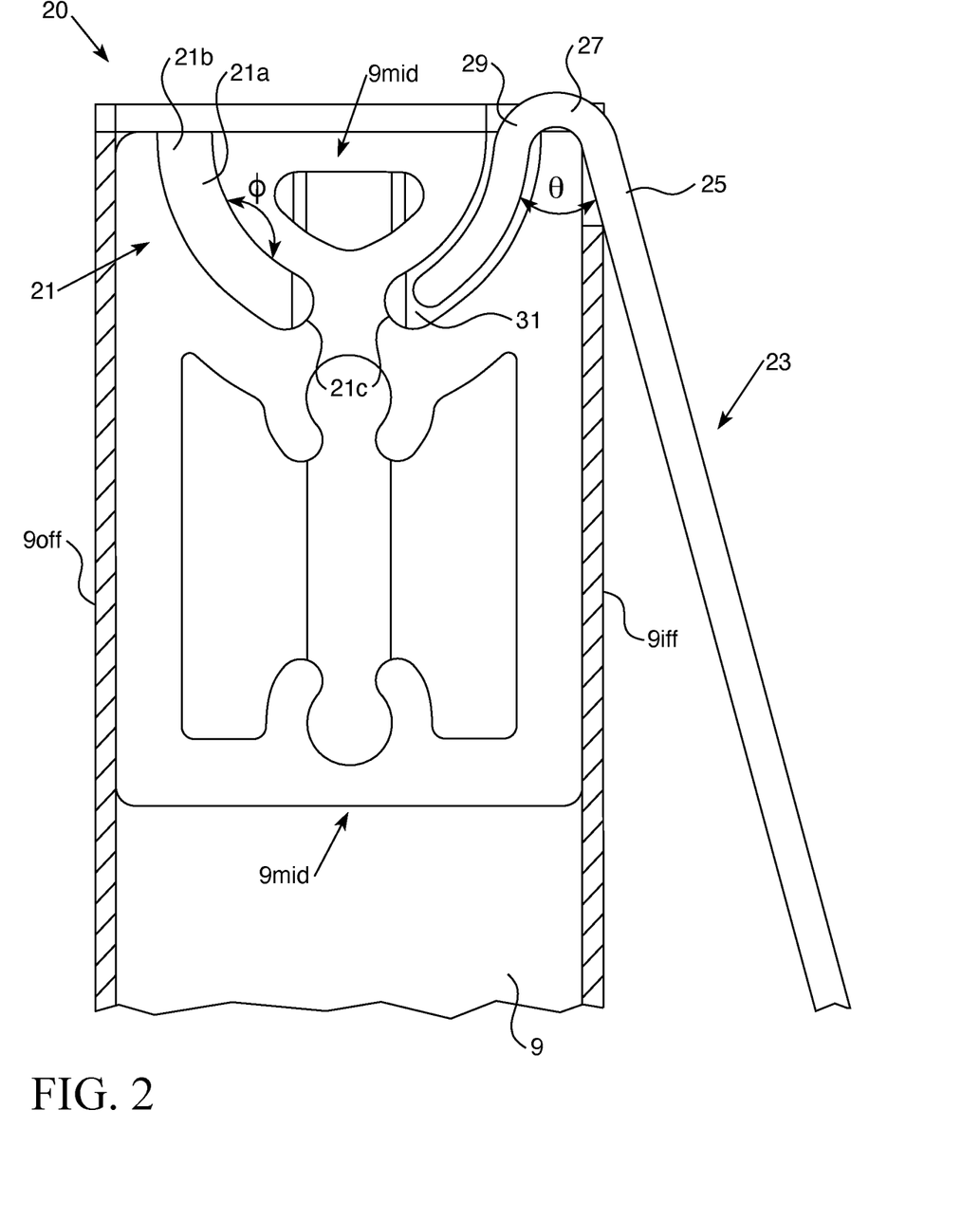
FIG. 2 is a fragmentary cross sectional view of the first exemplary embodiment of the privacy screen apparatus having a first exemplary embodiment of a screen attachment apparatus included therein to illustrate a releaseable connection mechanism of the privacy screen apparatus.
Figure 3:
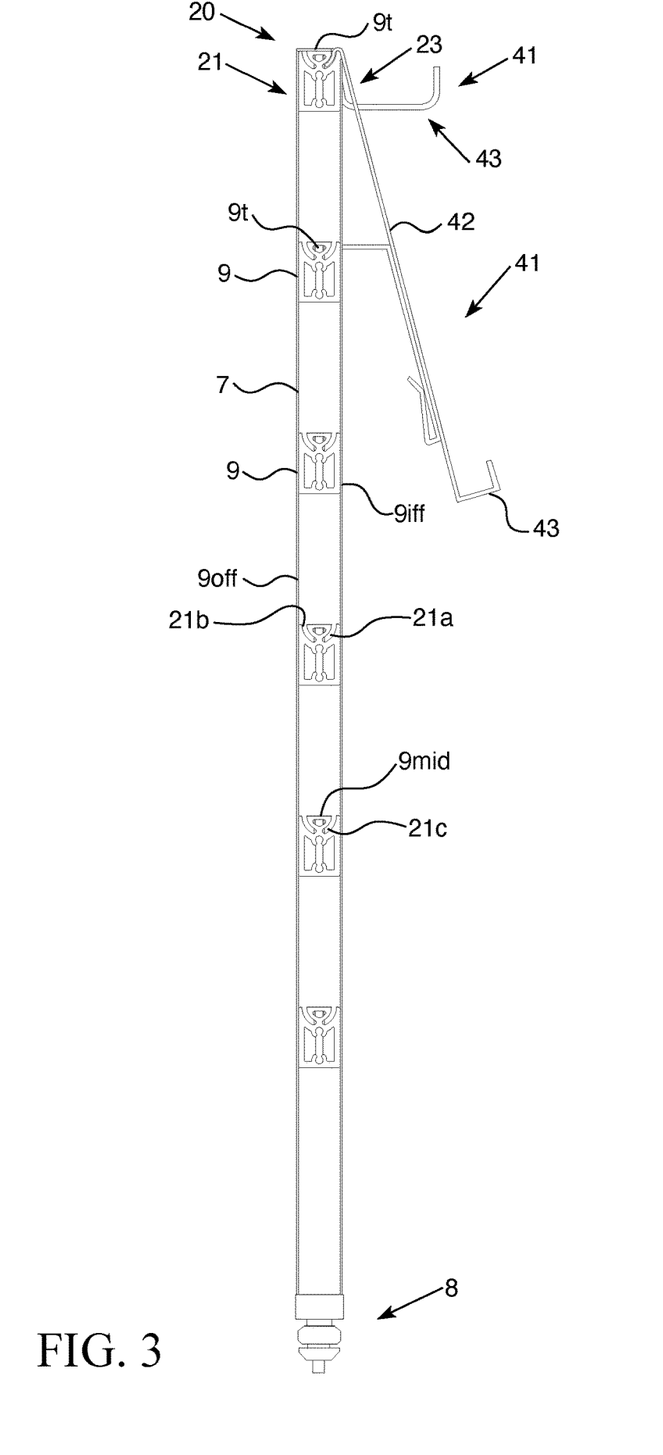
FIG. 3 is cross sectional view of the first exemplary embodiment of the privacy apparatus with a first exemplary connector of the connection mechanism utilizing the first exemplary embodiment of the screen attachment apparatus shown in FIG. 2.

Each receptacle 21 can be configured for releasable connection to a connector 23 to facilitate attachment of an object attached to one or more connectors 23. The object can be a panel sized to block one or more gaps 10 or can be another type of structure such as a basket, bag, pouch, or shelf for holding at least one tool (e.g. a pencil, a stylus, dry erasers, a smart phone, a tablet, at least one book, etc.). Each receptacle 21 can be positioned in the top side 9t of the rung or be integral to the top side 9t of the rung to define at least one curved channel 21a. Each channel 21a can be defined to extend from a mouth 21b at or adjacent a top of the top side 9t of the rung to a terminal end 21c. Each channel 21a can have an arcuate shape or arc-like shape in some embodiments. In some embodiments, the degree of curvature φ of the channel can be in the range of 5°-60°, 10°-50°, 15°-45°, 15°-30°, 20°-25°, or other range. The curvature of the channel 21c can be configured so that the channel 21a extends continuously downwardly and inwardly from the mouth 21b at or adjacent the top side 9t of the rung to a terminal end 21c that is positioned inward and below the top side 9t of the rung 9. Each channel 21a can have a length that is selected so that even when a connector 23 is positioned in the channel, there may be a space 31 between a terminal end of the connector 23 and the terminal end 21c of the channel 21a.

Each connector 23 can include an upper portion 25 that includes a terminal end 29 sized and configured to be releaseably inserted into the mouth 21b of the channel 21a and passed into and along the curved shape of the channel 21a to a position near the terminal end 21c of the channel 21a. Such a configuration can include each terminal end segment having a curvature and size (e.g. thickness and length) to mate with the curved channel 21a when inserted therein.

The terminal end 29 can be at a distal end of an end portion that extends from a curved segment 27 that is between the terminal end 29 and the upper portion 25 that extends downwardly away from the top side 9t of the rung 9. The upper portion 25 can extend at an angle θ relative to the terminal end 29 positioned in the channel 21a. The angle θ can be between 30° and 75° in some embodiments (e.g. 30°, 40°, 45°, 50°, 60°, etc.). In other embodiments, angle θ can be within a different range. The curved segment 27 can be positioned to be the top of the connector 23 when the connector 23 is attached to the rung 9 via an end portion of the terminal end 29 extending below the curved segment 27 within channel 21a. The terminal end 29 segment can have a curvature that is configured to mate with the curvature of the channel 21a in which it is positionable for insertion within the channel 21a.

The mating curvatures of the terminal end segment and channel 21a along with the curved segment 27 can help prevent the connector 23 from being dislodged from the receptacle 21 due to an unintentional upward force that may act on the connector 23 (e.g. from a user bumping a shelf or pouch attached to the connector or bumping a rung 9, etc.). The mating curved channel 21a and terminal end segment can avoid such dislodgement by requiring a force to be exerted on the connector to pull the terminal end 29 out of the channel 21a along the curved path (e.g. a non-linear path of motion). Jostling that may occur from a bump or other unintended force can result in the terminal end 29 contacting a part of the receptacle defining the curved channel 21*a* to retain the terminal end 29 therein due to the mating curvatures of the channel 21*a* and terminal end segment. In some embodiments, the mating curvatures of the terminal end 29 and the channel 21*a* can require a user to rotated the connector 21 so that the terminal end 29 is rotated as it is pulled out of the channel 21*a* to slide the terminal end 29 out of the channel 21*a* to release the connector 23 from the receptacle 21 without the use of any mechanical tool (e.g. a user only has to use his or her hand(s) to manipulate the connector 23 to release it from the receptacle).

The receptacle 21 and connector 23 can also be configured so that the connection between connector 23 and receptacle 21 can also be preformed without a mechanical tool. A user can slide the terminal end 29 through the mouth 21*b* of the channel 21*a* and into the channel 21*a* along the curved path of the channel 21*a* until the curved segment 27 is adjacent the mouth 21*b* for such an attachment. A user may only have to use his or her hands to manipulate the connector to facilitate such a releasable attachment.

Figure 4:
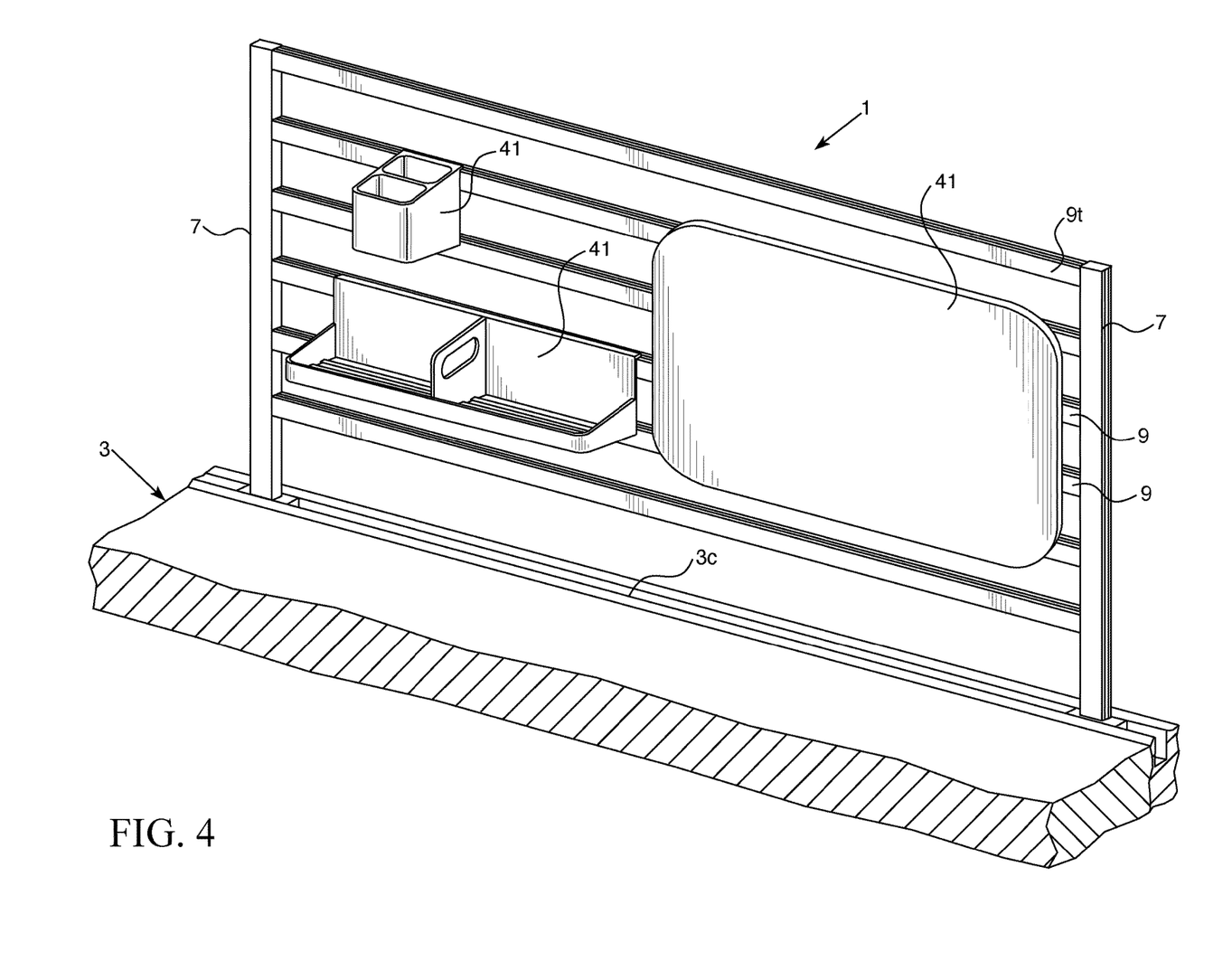
FIG. 4 is a perspective view of an exemplary embodiment of a privacy apparatus having multiple objects attached thereto.
Figure 5:
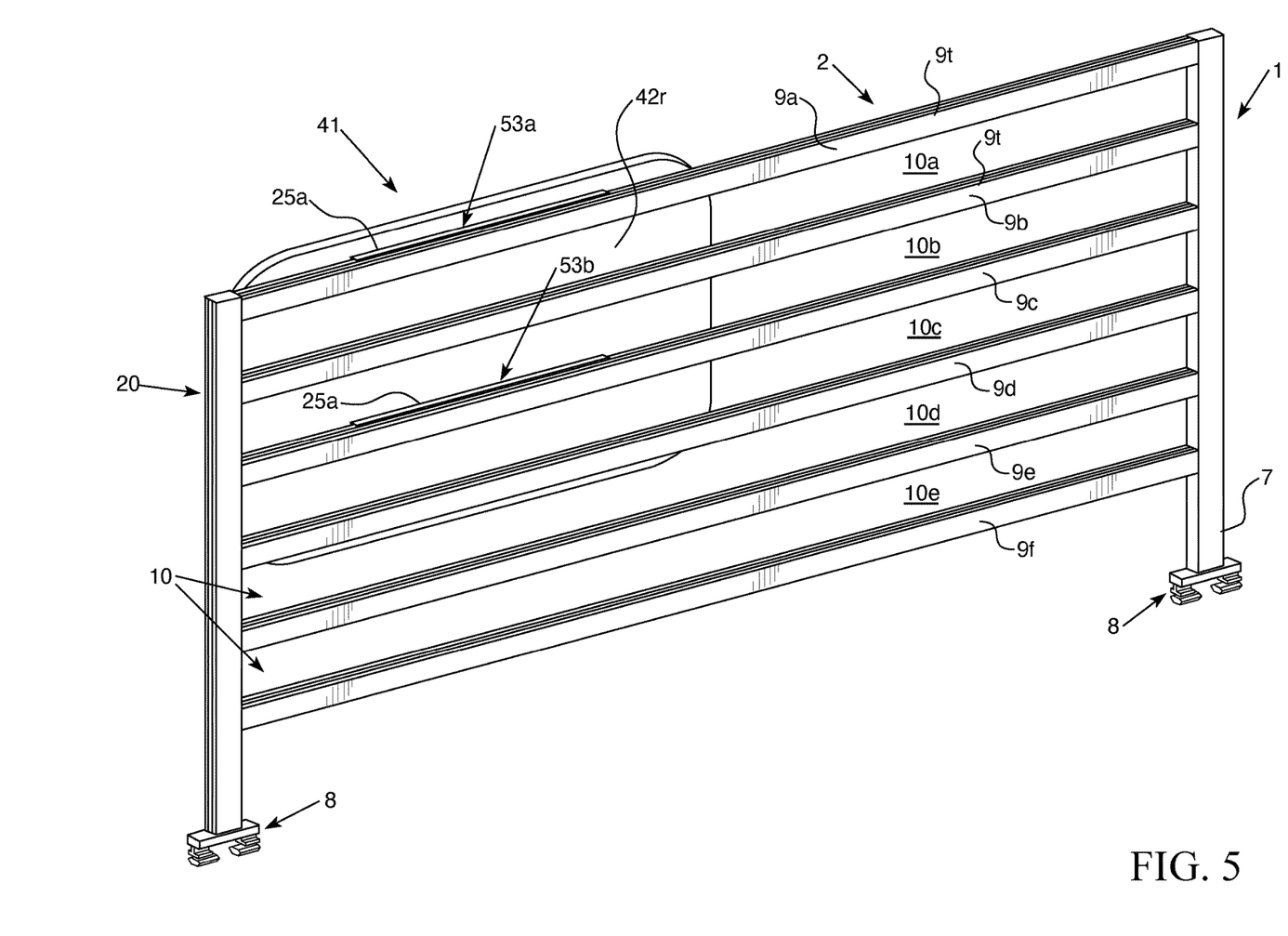
FIG. 5 is a perspective view of an exemplary embodiment of a privacy apparatus having a screen element attached thereto.

The connector 23 can have a connector side opposite its terminal end 29. The connector side can be attached to an object 41. The object 41 can include a panel 42 sized to at least partially cover one or more gaps 10. A portion of the object 41 can also be configured as a holding device 43 (e.g. a shelf or pouch). In other embodiments of the object 41, the object 41 can be configured as a holding device 43 without including any panel that may block portions of a gap. Some objects 41 may only require a single connector 23 while others may utilize two or more than two connectors 23. The terminal ends 29 of the connectors 23 can be positioned in the same channel 21*a* at different locations along the length L of the rung 21 for embodiments in which the channels 21*a* can extends horizontally along the entire length L or a substantial length L of the rung. In other embodiments, each terminal end 29 of each connector 23 can be positioned in a respective channel 21*a* of a respective receptacle 21 positioned in the top side 9*t* of the rung.

As can be appreciated from FIG. 2, each rung can have a first face 9*iff* and a second face 9*off*. These faces can face in opposite directions. Each receptacle 21 can include a first curved channel 21*a* adjacent the top side 9*t* of the rung at the first face 9*iff* and also include a second curved channel 21*a* adjacent the top side 9*t* of the rung 9 at the second face 9*off*. Such a configuration can allow connectors 23 to be inserted for attaching objects 41 for positioning those objects adjacent opposite sides of the screen body 2. This functionality can permit holding devices or panels to be adjustably positioned for different adjacent work spaces that different personnel may work.

As may best be appreciated from FIGS. 5-8, the ladder screen body 2 of the apparatus 1 can be configured for attachment to different types of objects 41. For instance, a panel 42 can be configured as a visibility blocking element 51 that has multiple connection devices 53. The connection devices 53 can include an upper connection device 53*a* that is spaced apart from a lower connection device 53*b*. Each connection device 53 can include at least one connector 23 that is attached to a rear side 42*r* of the body of the visibility blocking element 51 (e.g. via one or more fasteners, welding, and/or other fastening mechanism etc.).

Figure 6:
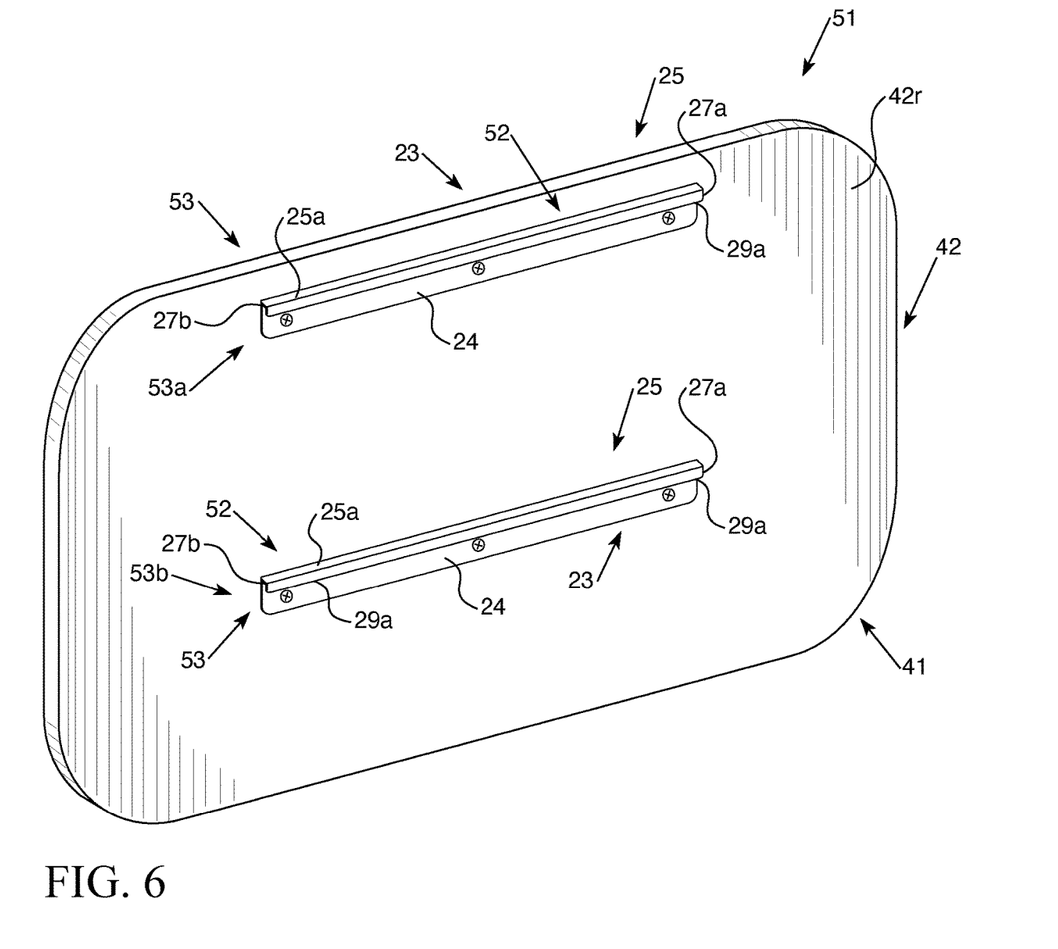
FIG. 6 is a rear perspective view of a visibility blocking element of the exemplary embodiment of a privacy apparatus shown in FIG. 5.
Figure 7:
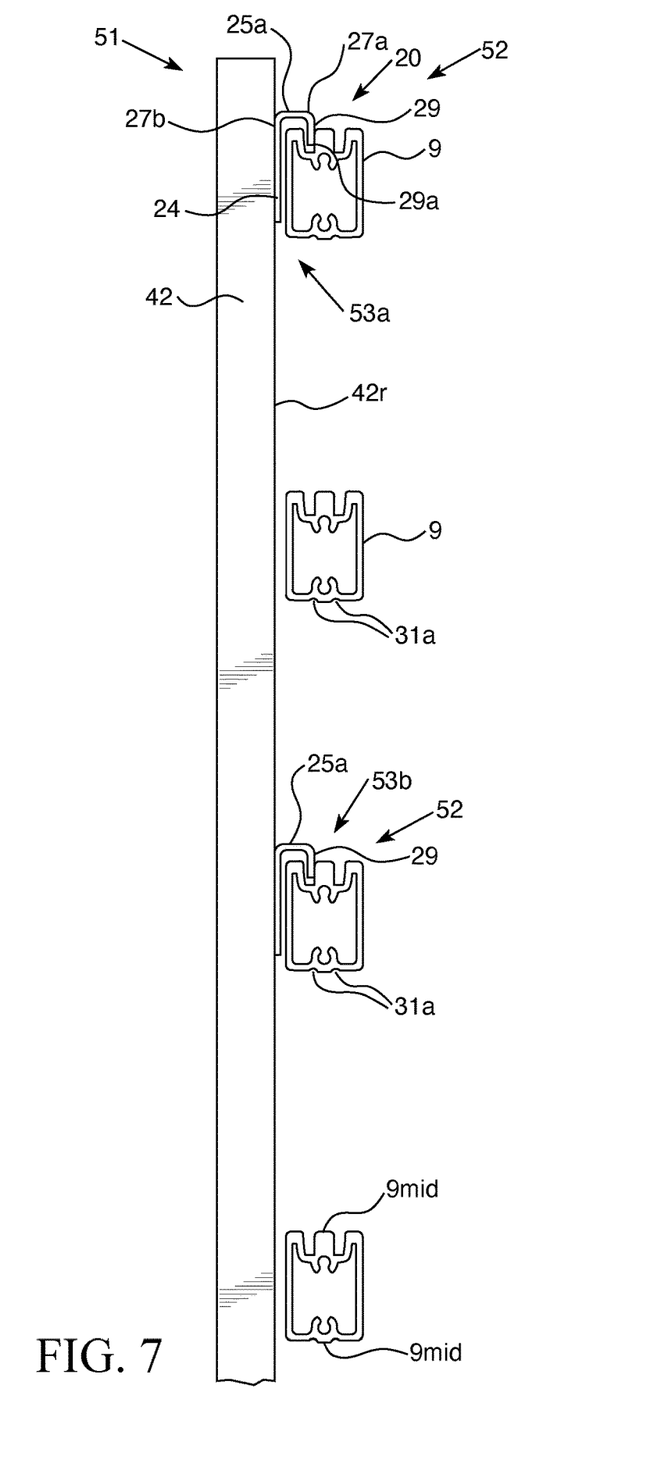
FIG. 7 is a cross sectional view of the exemplary embodiment of a privacy screen apparatus shown in FIG. 5.
Figure 8:
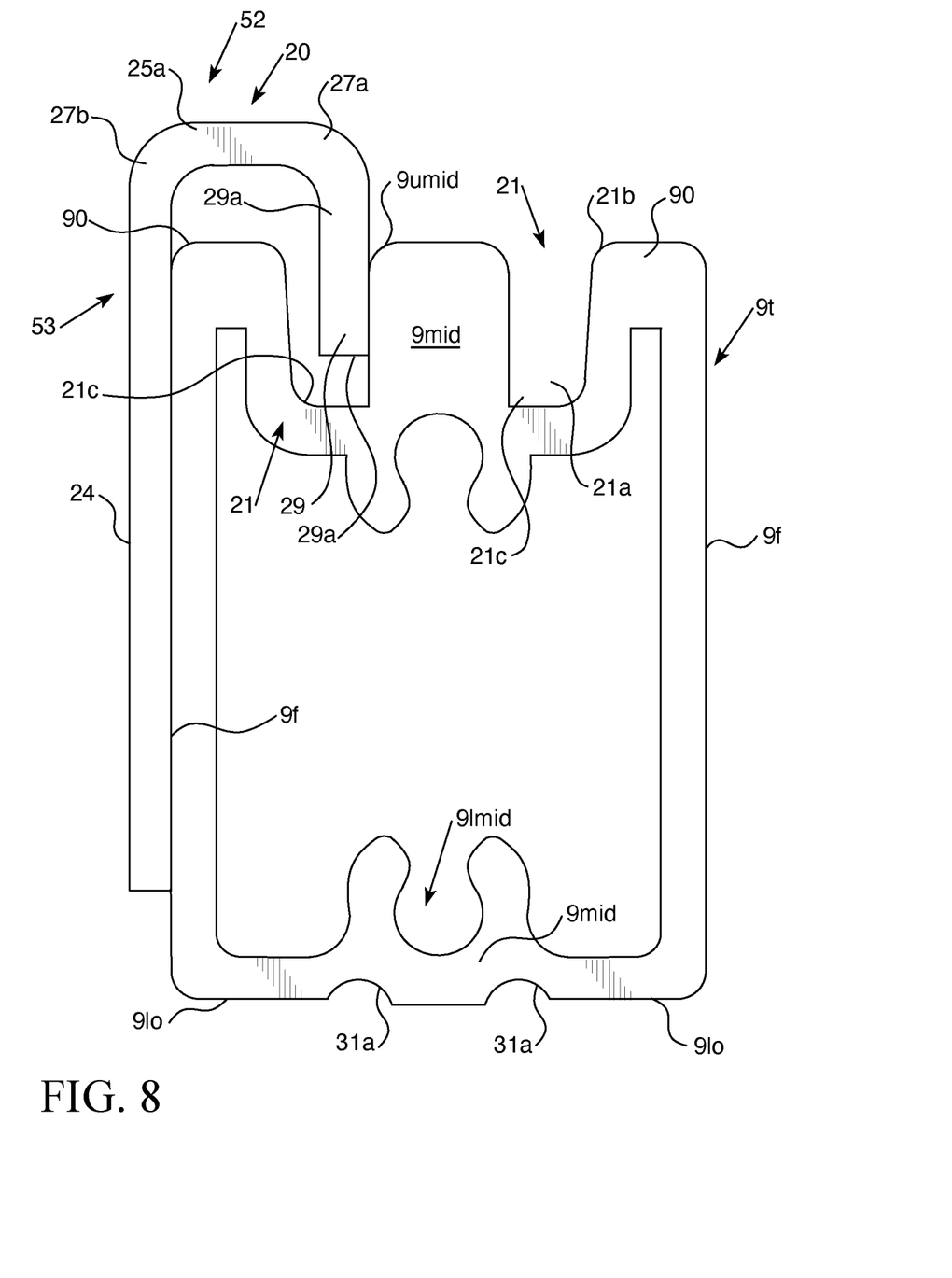
FIG. 8 is an enlarged fragmentary view of FIG. 7 that illustrates an exemplary attachment feature for releasable attachment of the visibility blocking element to a rung of the screen body 2.

As may best be appreciated from FIGS. 6-8, each connector 23 of each connection device 53 can include a hook element that extends from a distal, terminal end 29 to an attachment portion 24 that contacts the rear side 42*r* of the object 41 (e.g. panel 42) and/or can be positioned within the body of the object and extend from the rear side 42*r*. The hook elements 52 can be considered to have a J-shaped cross-sectional profile, a C-shaped cross-sectional profile, or a U-shaped cross-sectional profile in some embodiments. The upper and lower hook elements can be configured to facilitate releasable attachment of an object 41 to the screen body 2 so that no mechanical tools are not needed for attachment to or separation from the object 41 and screen body 2.

In some embodiments, the attachment portion 24 can be a flat segment of the hook element that is positioned to be in contact with the rear side 42*r* and be fastened to or otherwise attached to the rear side (e.g. via fasteners and/or an adhesive, etc.). Each hook element can include additional segments positioned between the terminal end 29 and the attachment portion 24. For example, each hook element can include a first upper curve portion 27*a*, an upper linearly extending portion 25*a*, and a second curved portion 27*b* between the attachment portion 24 and the terminal end 29. For instance, the body of each hook element can extend from the attachment portion such that the second curved portion 27*b* extends along a curve between the attachment portion 24 and the upper linearly extending portion 25*a*. The upper linearly extending portion 25*a* can extend between the first and second curved portions 27*a* and 27*b*. The first curved portion can extend along a curve between the upper linearly extending portion 25*a* and the terminal end 29. An end portion 29*a* can extend from the first curved portion 27*a* and the terminal end 29 linearly so that the end portion 29*a* is a vertically extending segment of the hook element.

The terminal end 29, end portion 29*a*, first curved portion 27*a*, linearly extending upper portion 25*a*, and second curved portion 25*a* can be sized and configured so that the terminal end 29 is positionable within a linearly extending channel 21*a* of the receptacle 21 of the rung 9*t*. The channel 21*a* can extend linearly from a bottom terminal end 21*c* of the channel 21*a* to an upper mouth 21*b* of the channel 21*a*. The receptacle of the rung 9*t* can be defined so an outer upper portion 9*o* of the rung 9*t* is between the mouth 21*b* and an outer face 9*f* (e.g. first face 9*iff* or second face 9*off*) of the rung 9*t*. Each linearly extending upper portion 25*a* can be sized to be positioned on the outer upper portion 9*o* of the rung 9*t*.

An upper middle portion 9*umid* of the rung 9*t* can be positioned between the mouths 21*b* of first and second channels 21*a*. The upper middle portion 9*umid* can help define an inner portion of each channel 21*a* and provide structure that separates the channels 21*a*.

The connection mechanism 20 for releasable attachment of an object 41 to the rungs 9*t* of a screen body 2 can utilize different types of spaced apart connection devices 53. For instance, an upper connection device 53*a* can include a hook element configuration similar to first connection device 53*a* shown in FIGS. 5-8 while a lower connector device 53*c* can include a different resilient hook configuration below the first connection device 53*a* that is configured to be matingly received within a lower aperture 31*a* define the a rung 9*t*. The lower aperture 31*a* can be a lower furrow, groove, channel or other lower aperture that has a bottom mouth at the bottom of the rung and extends into the body of the rung to a terminal end within the rung. Each lower aperture 31*a* can extend along a length of the rung 9*t* long the bottom of the rung 9*t*.

Each rung 9*t* can have a first lower aperture 31*a* that is adjacent a first face 9*f* of the rung and a second lower aperture 31*a* adjacent a second face 9*f* of the rung. The first and second lower apertures 31a can be spaced apart from each other by a lower central portion 9lmid of the body of the rung. Each rung 9t can also have first and second outer lower portions 9lo. Each outer lower portion 9lo can extend from a respective first aperture 31a to a face 9f of the rung and be separated by the lower central portion 9lmid via the first aperture 31a from which that lower outer portion 9lo extends.

Each first aperture 31a can have a defined profile in the body of the rung to receive a protrusion 26b of a lower connector device 53a that can extend from an upper side (or top side) of a linearly elongated connector portion 26a that extends away from a rear side 42r of an object 41 (e.g. extending away from an attachment portion 24 of a connection device). The attachment portion 24 from which the lower linearly extending elongated connector portion 26a extends can be a separate attachment portion 24 similar to the arrangement shown in FIG. 6 or can be integral with the attachment portion of the upper connection device 53a as may best been seen in FIGS. 9 and 10.

Figure 9:
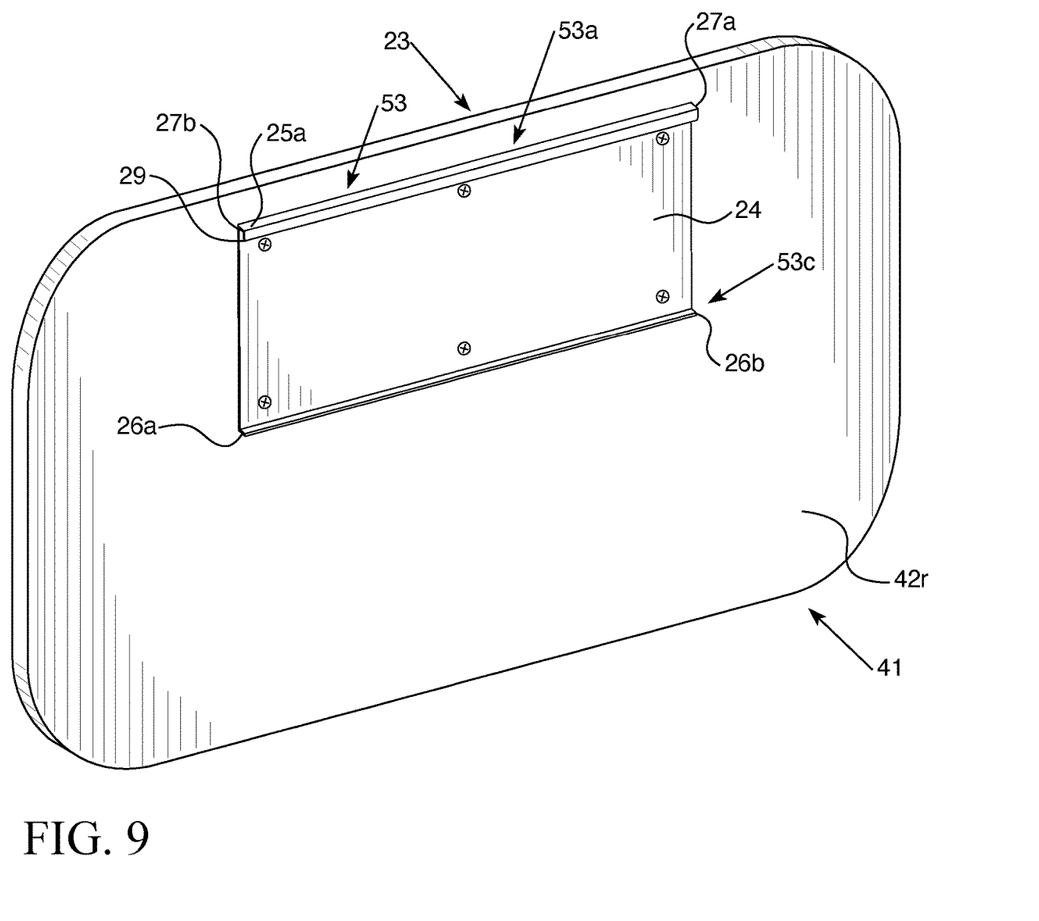
FIG. 9 is a rear side perspective view of an exemplary visibility blocking element that can be utilized in embodiments of the privacy screen apparatus for releasable attachment to the screen body 2 of a privacy screen apparatus.
Figure 10:
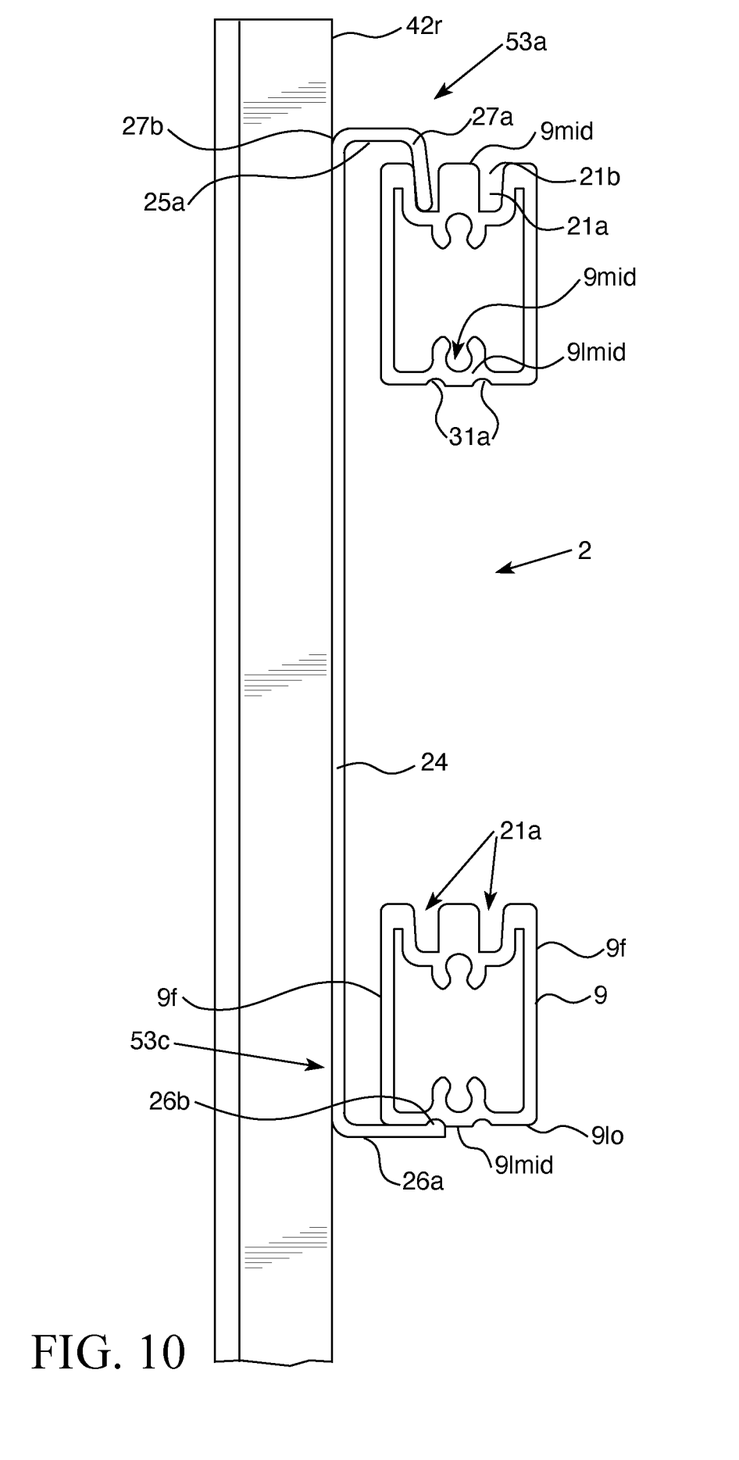
FIG. 10 is a fragmentary cross-sectional view similar to FIG. 7 of the connection mechanism for the releasable attachment of the exemplary visibility blocking element shown in FIG. 9 to the screen body 2 of a privacy screen apparatus.

The lower hook element of the lower connection device 53c having the lower linearly extending elongated connector portion 26a and protrusion 26b that projects upwardly from an upper side of the lower linearly extending elongated connector portion 26a can be considered an L-shaped type hook element that has an L-shape cross-sectional profile. The lower linearly extending elongated connector portion 26a can be resiliently attached to the attachment portion 24 or be configured to be resilient to flex when that portion is brought into contact with the body of the rung 9t for positioning the protrusion 26b into the lower aperture 31a. The positioning of protrusion 26b into the lower aperture 31a can help locate and position the object 41 for attachment to one of the rungs 9t at the same time an upper rung is brought into connection with the upper connection device 53a via the upper channel of a corresponding receptacle of that upper rung 9t. For example, the lower connection device 53c can be releaseably attached to the third rung 9c when the upper connection device 53a is releaseably attached to the first rung 9a. This type of arrangement can allow for a secure attachment of the object 41 to the screen body 2 via the spaced apart rungs 9ts that permits the attachment to occur without the use of any mechanical tools (e.g. only a user's hands can be needed to position and attach the object to the screen body 2). The object can also be rotated out of engagement with the lower aperture 31a of a lower rung 9t and the upper channel 21a of an upper rung 9t to remove the object from the screen body 2 without use of any mechanical tool. For such a removal, the lower connection device 53c or the upper connection device 53a may be disengaged from the rung to which it is engaged before the other connection device is disengaged for such a removal via rotation of the object 41.

Each rung 9t can include first and second channels 21a spaced apart by a central, intermediate portion 9mid of the rung body. Each rung can also include first and second lower apertures 31a that are spaced apart by a lower central portion 9lmid (which can also be considered a type of intermediate lower portion) in some embodiments. The multiple receptacles in each rung 9t can allow for different objects 41 to be positioned on opposite sides of the screen body 2 to cover the first and second faces 9iff and 9off of different rungs 9t on the sides of the screen body 2. There may be multiple different objects 41 attached to the same set of rungs and/or to different rungs of a screen body at opposite sides of the screen body 2. Each of the objects 41 can be attached to the rungs utilizing the same type of connection mechanism 20 to allow for an ease of assembly and disassembly and an adjustment of the configuration of the apparatus 1 to meet changing operational needs.

Embodiments of the privacy screen apparatus 1 can be configured to utilize a screen body 2 that can provide for panels 42 to be attached thereto that can function as a privacy screen and/or holder devices, pouches, or other functional items positionable adjacent a work space. In some embodiments, a rear side 42r of an object can function as a privacy screen while a front side of the object can have one or more other profiles or structures thereon (e.g. a hook for retaining a hat, a receptacle for a cup or pencils, etc.). The objects 41 can be configured to help provide an additional barrier between workers at adjacent work spaces to improve worker privacy and/or safety.

Embodiments of the privacy apparatus 1 can be utilized for positioning adjacent to work surfaces. Embodiments can be provided to a customer as components and assembled on site. Objects having connection devices 53 (e.g. one or more connectors 23, first, second and/or third connection devices 53a, 53b, 53c, etc.) can be releaseably attached to rungs of the apparatus without the use of mechanical tools during the assembly of the apparatus. After the objects are attached, they can be separated from the screen body and either rearranged for a different arrangement for reattachment to the screen body 2 or removed to be replaced by other objects having one or more connection devices 53. The removed object can be removed for being disposed of or used with a different embodiment of another apparatus. The adjustability of the releasable attachment of objects provided by the spaced apart rungs and connection devices can facilitate easy installation and also allow for easy adjustment in position, orientation and configuration of an installed apparatus. Further, such tasks can be performed without requiring use of mechanical tools, which can help improve the speed with which such tasks are able to be performed.

During attachment of an object to the screen body 2, a user may engage a first connection device with an upper rung and then proceed to manipulate the screen body so a lower second connection device engages a second rung spaced apparat from the upper rung after the first rung is attached to the upper first connection device. This configuration can permit an easy installation process that can permit an intuitive attachment process for attachment of objects to the screen body 2 that can be relatively easy and quick to perform.

In other embodiments of the apparatus (e.g. an embodiment utilizing first and second connection devices 53a and 53b shown in FIGS. 5-8), the user may engage the first connection device with an upper rung at the same time (or about the same time) as the second connection device engages the lower rung spaced below the upper rung. This can permit a simultaneous engagement of an object with the rungs of the screen body for quick releasable attachment thereto. This attachment process can also be quite intuitive for a user so that the attachment process is considered easy to perform and can be performed quickly.

It should be appreciated that different embodiments can have different structures to meet a particular set of design criteria. For instance, other embodiments can utilize more than six rungs 9 and other embodiments may utilize less than six rungs. The size of each gap 10 can be a uniform size or can be configured to vary in distance for different embodiments to provide a pre-selected aesthetic effect and/or visible barrier. The thickness of each rung 9 can also be the same or can be different. As yet another example, each apparatus can utilize multiple objects 41 of different types of one or more objects 41 of the same type for attachment to the screen body 2.

It should be understood that other modifications to the privacy screen apparatuses and screen attachment apparatuses can be made to meet a particular set of design criteria. For example, it is contemplated that a particular feature described, either individually or as part of an embodiment, can be combined with other individually described features, or parts of other embodiments. The elements and acts of the various embodiments described herein can therefore be combined to provide further embodiments. As another example, the size, shape and weight of a screen body can be any size or shape to meet a particular set of design criteria. As yet another example, the type of mounting connector that is utilized in an embodiment of the privacy screen apparatus or privacy screen attachment apparatus for positioning of the privacy screen apparatus adjacent a work surface to provide a visible barrier may be any type of connector structure geometry that may facilitate use of a pre-selected fastening mechanism (e.g. bolts, screws, etc.) to meet a particular set of design criteria.

Therefore, while certain exemplary embodiments of privacy screen apparatuses, connection mechanisms for privacy screen apparatuses (e.g. screen attachment apparatuses), and methods of making and using the same have been discussed and illustrated herein, it is to be distinctly understood that the invention is not limited thereto but may be otherwise variously embodied and practiced within the scope of the following claims.

What is claimed is:

1. A privacy screen apparatus comprising:
a first vertically elongated member;
a second vertically elongated member;
a plurality of spaced apart rungs extending between the first vertically elongated member and the second vertically elongated member, each of the rungs has a top side, the top side having a receptacle that defines a first channel, the first channel being curved from a mouth of the first channel defined at or adjacent the top side of the rung to a terminal end of the channel that is located within the rung below the mouth and inward of the mouth;
a first connector that is releaseably attachable to the receptacle via the first channel;
the first vertically elongated member positionable adjacent a work surface and the second vertically elongated member positionable adjacent the work surface;
an object, the first connector attached to a rear side of the object; and
a second connector attached to the rear side of the object below the first connector, the second connector configured as a hook element for releasable attachment to one of the rungs below the rung to which the first connector is attachable.

2. The privacy screen apparatus of claim 1, comprising a first attachment device connected to the first vertically elongated member and a second attachment device connected to the second vertically elongated member, wherein the first attachment device comprises a clamping mechanism and the second attachment device comprises a clamping mechanism.

3. The privacy screen apparatus of claim 1, wherein the rungs comprise a first top rung, a second rung below the first top rung, and a third rung below the second rung, the first top rung and the second rung spaced apart by a first gap, the second rung and the third rung spaced apart by a second gap.

4. The privacy screen apparatus of claim 1,
wherein the rungs comprise a first top rung, a second rung below the first top rung, and a third rung below the second rung, the first top rung and the second rung spaced apart by a first gap, the second rung and the third rung spaced apart by a second gap;
the first connector being releaseably attachable so that attachment of the first connector to the rung and releasing of the first connector from the rung occur without use of any mechanical tool.

5. The privacy screen apparatus of claim 4, wherein the first connector has a terminal end portion that is curved to mate with the first channel so that the connector is releasable from the first channel via pulling the connector while the connector is rotated along the curvature of the first channel.

6. The privacy screen apparatus of claim 4, wherein the first connector has a curved segment that extends between a terminal end of the first connector and an upper portion of the first connector that extends downwardly from the curved segment when the terminal end is within the first channel, the curved segment being a top of the first connector when the terminal end is within the first channel.

7. The privacy screen apparatus of claim 4, wherein:
the first connector is configured as a hook element such that a terminal end portion extends linearly from a terminal end to a first upper curved portion and a linearly extending upper portion extends from the first upper curved portion to a second upper curved portion for positioning on an outer upper portion of the rung between the mouth of the first channel and an outer face of the rung.

8. The privacy screen apparatus of claim 7, wherein the first connector includes an attachment portion extending from the second upper curved portion, the attachment portion sized and configured for attachment to the rear side of the object.

9. A privacy screen apparatus comprising:
a first vertically elongated member;
a second vertically elongated member;
a plurality of spaced apart rungs extending between the first vertically elongated member and the second vertically elongated member, each of the rungs has a top side, the top side having a receptacle that defines a first channel, the first channel being curved from a mouth of the first channel defined at or adjacent the top side of the rung to a terminal end of the channel that is located within the rung below the mouth and inward of the mouth;
a first connector that is releaseably attachable to the receptacle via the first channel;
the first vertically elongated member positionable adjacent a work surface and the second vertically elongated member positionable adjacent the work surface;
an object, the first connector attached to the object;
each of the rungs having a bottom side, the bottom side having a lower aperture extending along a length of the rung; and
a second connector attached to the object such that the second connector is positioned below the first connector, the second connector having a linearly elongated connector portion extending away from a rear side of the object and a protrusion that vertically extends from an upper side of the linearly elongated connector portion for being matingly positioned within the lower aperture of one of the rungs for releasable attachment to that rung while the first connector is releaseably attached to another one of the rungs, the first connector being positioned above the second connector.

10. The privacy screen apparatus of claim 9, wherein attachment of the first connector and releasing of the first connector is occurrable without use of any mechanical tool.

11. The privacy screen apparatus of claim 9, wherein the first connector has a terminal end portion that is curved to mate a curvature of the first channel so that the first connector is releasable from the first channel via pulling the first connector while the first connector is rotated along the curvature of the first channel.

12. An article of furniture comprising:
a work surface;
the privacy screen apparatus of claim 9 positioned adjacent the work surface.

13. A privacy screen apparatus comprising:
a first vertically elongated member;
a second vertically elongated member;
a plurality of spaced apart rungs extending between the first vertically elongated member and the second vertically elongated member, each of the rungs has a top side, the top side having a receptacle that defines a first channel, the first channel being curved from a mouth of the first channel defined at or adjacent the top side of the rung to a terminal end of the channel that is located within the rung below the mouth and inward of the mouth;
wherein the rungs comprise a first top rung, a second rung below the first top rung, and a third rung below the second rung, the first top rung and the second rung spaced apart by a first gap, the second rung and the third rung spaced apart by a second gap;
a first connector that is releaseably attachable to the receptacle via the first channel;
the first vertically elongated member positionable adjacent a work surface and the second vertically elongated member positionable adjacent the work surface;
the first connector is attached to an object, the first connector releaseably attachable to the first top rung,
each of the rungs having a bottom side, the bottom side having a lower aperture extending along a length of the rung; and
the privacy screen apparatus also includes a second connector attached to the object such that the second connector is positioned below the first connector, the second connector having a linearly elongated connector portion extending away from the rear side of the object and a protrusion that vertically extends from an upper side of the linearly elongated connector portion for being matingly positioned within the lower aperture of the third rung for releasable attachment to the third rung while the first connector is releaseably attached to the first top rung.

14. The privacy screen apparatus of claim 13, wherein the first connector has a curved segment that extends between a terminal end of the first connector and an upper portion of the first connector that extends downwardly from the curved segment when the terminal end is within the first channel, the curved segment being a top of the first connector when the terminal end is within the first channel.

15. The privacy screen apparatus of claim 14, wherein the rungs comprise a fourth rung below the third rung, and a fifth rung below the fourth rung, the fourth rung and third rung spaced apart by a third gap, the fourth rung and the fifth rung spaced apart by a fourth gap.

16. The privacy screen apparatus of claim 15, wherein the rungs comprise a sixth rung below the fifth rung, the fifth rung and the sixth rung spaced apart by a fifth gap; and
wherein the rungs are positionable above the work surface.

17. A privacy screen apparatus comprising:
a first vertically elongated member;
a second vertically elongated member;
a plurality of spaced apart rungs extending between the first vertically elongated member and the second vertically elongated member, each of the rungs has a top side, the top side having a receptacle that defines a first channel, the first channel being curved from a mouth of the first channel defined at or adjacent the top side of the rung to a terminal end of the channel that is located within the rung below the mouth and inward of the mouth;
wherein the rungs comprise a first top rung, a second rung below the first top rung, and a third rung below the second rung, the first top rung and the second rung spaced apart by a first gap, the second rung and the third rung spaced apart by a second gap;
a first connector that is releaseably attachable to the receptacle via the first channel, the first connector being releaseably attachable so that attachment of the first connector to the rung and releasing of the first connector from the rung occur without use of any mechanical tool, the first connector being configured as a hook element such that a terminal end portion extends linearly from a terminal end to a first upper curved portion and a linearly extending upper portion extends from the first upper curved portion to a second upper curved portion for positioning on an outer upper portion of the rung between the mouth of the first channel and an outer face of the rung;
the first vertically elongated member positionable adjacent a work surface and the second vertically elongated member positionable adjacent the work surface;
a panel having a body, the first connector attached to a rear side of the body;
a second connector attached to the rear side of the body below the first connector, the second connector configured as a hook element for releasable attachment to one of the rungs below the rung to which the first connector is attachable, the second connector having a terminal end portion extending linearly from a terminal end to a first upper curved portion and a linearly extending upper portion extending from the first upper curved portion to a second upper curved portion for positioning on an outer upper portion of the rung below the rung to which the first connector is attachable, the outer upper portion of the rung below the rung to which the first connector is attachable being between the mouth of the first channel of the rung and an outer face of the rung.

18. A privacy screen apparatus comprising:
a first vertically elongated member;
a second vertically elongated member;
a plurality of spaced apart rungs extending between the first vertically elongated member and the second vertically elongated member, each of the rungs has a top side, the top side having a receptacle that defines a first channel, the first channel being curved from a mouth of the first channel defined at or adjacent the top side of the rung to a terminal end of the channel that is located within the rung below the mouth and inward of the mouth;

wherein the rungs comprise a first top rung, a second rung below the first top rung, and a third rung below the second rung, the first top rung and the second rung spaced apart by a first gap, the second rung and the third rung spaced apart by a second gap;

a first connector that is releaseably attachable to the receptacle via the first channel, the first connector being releaseably attachable so that attachment of the first connector to the rung and releasing of the first connector from the rung occur without use of any mechanical tool;

the first vertically elongated member positionable adjacent a work surface and the second vertically elongated member positionable adjacent the work surface;

an object, the first connector attached to the object via an attachment portion;

each of the rungs having a bottom side, the bottom side having a lower aperture extending along a length of the rung; and a second connector attached to the object such that the second connector is positioned below the first connector, the second connector having a linearly elongated connector portion extending away from a rear side of the object and a protrusion that vertically extends from an upper side of the linearly elongated connector portion for being matingly positioned within the lower aperture of the third rung for releasable attachment to the third rung while the first connector is releaseably attached to the first top rung.

* * * * *